Patented June 6, 1939

2,160,833

UNITED STATES PATENT OFFICE 2,160,833

COLD LAID ROCK ASPHALT PAVING MIXTURE AND METHOD OF MAKING

Joseph H. Conzelman, Birmingham, Ala., assignor to Alabama Asphaltic Limestone Company, Birmingham, Ala., a corporation of Alabama No Drawing. Application May 7, 1937, Serial No. 141,243

16 Claims. (Cl. 106—31)

This invention relates to a new and improved rock asphalt paving material, and more particularly to the method of preparing a mixture containing rock asphalt and a bituminous cement, which can be laid cold or warm and which will be stable regardless of the thickness in which it is to be laid, density of its mixture, or intensity of traffic on the freshly laid paving, and a mixture that will be workable.

Cold laid rock asphalt paving mixtures manufactured from rock asphalts low in native bitumen are made by adding bitumen either in the form of a cutback or an emulsion to the rock asphalt. Mixtures in which the added bitumen is emulsified have been used where the rock asphalt is a bituminous sandstone. These lean asphaltic sandstone mixtures whose bitumen content has been built up to the required amount by adding bituminous emulsion are more susceptible to deterioration from the action of moisture than mixtures using the same rock asphalt and a hot asphalt cement—which of course could not be laid cold. These emulsion mixtures have the added disadvantage of being difficult, or impossible, to cure to the point, in any reasonable time, where they will bond together satisfactorily in cool weather. Many jobs laid in the fall deteriorate badly during the first winter's traffic. Cold laid limestone rock asphalt mixtures, in which straight asphalt emulsion is used to increase the bitumen content to the necessary amount, have not been found satisfactory, partly because limestone rock asphalt contains a relatively high percentage of very fine particles which tend to break many emulsions immediately, and for the further reason that this type of mixture must be treated to facilitate fluxing of the native asphalt with the added asphalt.

Cold laid rock asphalt, in which a liquefier, such as naphtha and asphalt cement or a liquefied asphalt, is used to increase the bitumen content and make the mix workable, have ordinarily been asphaltic limestone mixtures. The purpose of the liquefier is to facilitate coating the cold particles of aggregate with bitumen and to keep the mixture workable until it is laid. The percentage of naphtha, or other solvent, necessary to accomplish this purpose is so high that in a well graded mixture the liquefier does not evaporate rapidly enough and the resulting pavement distorts and fails under traffic. If such mixtures are laid one to two inches thick, the process of laying must provide a means for rapid evaporation of the solvent, or must allow an extended period, varying with air temperature, for the naphtha to evaporate normally. Careless supervision, inconvenience and expense all operate against safe drying out of these mixes in actual practice, therefore the safe use for them is limited to thin surfaces in less than one inch in thickness.

To overcome these disadvantages in emulsion and liquefied asphalt cold mixes, the fines can be removed from the mixture and the pavement when laid will cure more rapidly. Such mixtures, contain a high percentage of voids and are very susceptible to deterioration from the action of moisture and air. Cold mixtures should be as well graded as hot asphalt mixtures.

Therefore, in order to produce a rock asphalt mixture which can be laid cold, and which will not have these objectionable qualities I have found that by heating the rock asphalt, mixed with a small amount of non-bituminous mineral aggregate if limestone rock asphalt is used, and mixing hot with an emulsified flux oil and the necessary percentage of asphalt cement, a stable and workable cold laid mixture, properly graded, can be produced. This mixture can be made as dense or low void as desired, and may be safely laid to any thickness without fear of displacement or lack of stability under traffic.

This mixture would not be sufficiently workable if allowed to cool before laying, however, without controlling mixing temperature, percentage of non-bituminous aggregate if limestone rock asphalt is used, and amount of water added to the mixture. Non-bituminous mineral aggregates do not have as high affinity for asphalt as do bituminous aggregates. It is therefore possible to uncoat or strip the asphalt off the particles of non-bituminous aggregate in the mixture by adding water to the batch in the mixer, before, during, or after the emulsified flux oil and asphalt cement has been mixed in the batch. The amount of stripping, or removal of bituminous coating, can be controlled by varying the temperature at which the batch is mixed. At a relatively low mixing temperature practically all of the non-bituminous aggregate in the batch can be stripped. As the temperature at which the batch is mixed is increased the percentage of stripped particles decreases. It is therefore possible to produce a well graded, dense cold laid rock asphalt mixture which can be kept workable for a short or long period by controlling the percentage of uncoated non-bituminous particles of aggregate in the mixture. To keep the mix workable the percentage of uncoated particles need never be high enough to endanger the bonding or cementing properties of the mix when laid. The rock asphalt, having a high affinity for asphalt, takes up the bitumen that the non-bituminous particles of aggregate drop. After the mixture is laid and subjected to the heat of the sun and the action of traffic, the uncoated particles are held by the slightly enroched rock asphalt and take up sufficient bitumen to bond tightly in the mixture.

When the rock asphalt used in the mixture is a low bitumen content asphaltic sandstone it will usually be unnecessary to add non-bituminous aggregate to the rock asphalt, for the reason that low bitumen content sandstone rock asphalt usually contains sufficient particles of sand grains that are not coated, or only partially or lightly coated, with natural asphalt to provide sufficient aggregate which will strip in the mixer. Non-bituminous aggregate may be added if necessary. The sandstone rock asphalt cold mixture made by this process will have the very decided advantage of being mixed warm or hot with the added asphalt. This results in a cold mixture very superior to that produced by adding the necessary bitumen in the form of an emulsion because the particles of aggregate will be more intimately coated with the added asphalt and will be less susceptible to injury from moisture action after the pavement is laid. It is also possible to add dust, or filler, to the sand rock asphalt to reduce the voids in the mixture.

In carrying out one embodiment of this invention, rock asphalt mixed with twenty percent of sand, finely crushed gravel or any satisfactorily graded non-bituminous mineral aggregate, may be heated in any approved drier to the desired temperature. This temperature may be 150° F. to 200° F. if it is desired to strip a high percentage of the non-bituminous aggregate. If a relatively small percentage is to be uncoated the mixing temperature may be 250° F., depending on the character of the non-bituminous aggregate used. This heated aggregate consisting of rock asphalt and nonbituminous aggregate can be weighed into a mixer, preferably a pug mill, and an appropriate emulsified flux oil added. The percentage and characteristics of flux oil used are predetermined for the desired consistency of the finally fluxed total bitumen content of the mixture which comprises native asphalt, added asphalt cement and flux oil. Water in the desired quantity may then be added to the mixture. If only slight stripping of the non-bituminous aggregate is necessary, the amount of water used is decreased, and conversely the amount of water used is increased if maximum stripping, or workability, was wanted. Hot bituminous cement in the required amount may then be added and uniformly distributed throughout the mixture. The box weights for a typical 2,000 pound batch of mixture may be as follows:

|  | Pounds |
|---|---|
| Rock asphalt (containing 20% of sand) | 1,882 |
| Emulsified flux oil | 35 |
| Water | 18 |
| Asphalt cement | 65 |
| Total | 2,000 |

The rock asphalt used in this example is an asphaltic limestone containing approximately four and one-half percent of native asphalt, having a penetration of about 20 at 77° F., 100 gm., 5 sec. Coarse concrete sand is used for non-bituminous aggregate. The emulsified flux oil used in this mixture contains about 65% of residue after distillation, A. S. T. M. still method. The residue has a penetration higher than 300 at 77° F., 100 gm., 1 sec. The asphalt cement used in this example is 99% bitumen and has a penetration at 77° F., 100 gm., 5 sec. of 85 to 100.

An example of a bituminous sandstone mixture made by this process would be as follows:

|  | Pounds per batch |
|---|---|
| Asphaltic sandstone (20% non-bituminous aggregate if desired) | 1,895 |
| Emulsified flux oil | 24 |
| Water | 25 |
| Asphalt cement | 56 |
| Total | 2,000 |

The sandstone rock asphalt used in this example contains four percent of native bitumen, having a penetration of approximately 200 at 77° F., 100 gm., 5 sec. The same flux oil used in the previous example was used in this mixture. The added asphalt cement used had a penetration of 130 at 77° F. 100 gm., 5 sec.

The invention is not to be construed as limited to use of the flux oil described. Bituminous flux used may be varied in consistency for various grades of asphalt found in the natural rock asphalt, and for the grade of added bitumen to be used. The amount of flux oil may be varied to meet varying workability or storage requirements. The consistency and amount of added bituminous cement may be varied for different rock asphalts and for various climatic and traffic conditions. The bituminous cement and the flux may be tars. The steps in adding the emulsified flux, water and asphalt cement may be changed from those shown. A satisfactory mixture can be made by adding the hot asphalt cement to the batch first, then adding either water and emulsified flux, or emulsified flux and water. The water may be added to the batch first and the other ingredients then added. Added non-bituminous aggregate may be increased or decreased within reasonable limits.

From the foregoing it will be obvious that this invention may be construed as broadly applicable to the manufacture of a paving mixture using a rock asphalt to which bitumen must be added to make a satisfactory paving mixture; the use of a percentage of non-bituminous mineral aggregate when the rock asphalt is a limestone, or when it does not contain particles of aggregate that will strip or partially strip when the other ingredients are added to the mixture; the use of emulsified flux oil, water and asphalt cement in a manner to produce a minimum or maximum amount of stripping of non-bitumineous aggregate to produce a cold laid mixture that is workable immediately after mixing, or after extended storage.

I therefore do not wish to be restricted to the specific embodiments herein described, except such as come within the scope of the appended claims, as it will be obvious to one skilled in the art that a study of the materials selected for use makes possible variation of character of material and manipulation in mixing to produce characteristics of mixture required for any particular storage and service conditions.

I claim as my invention:

1. The method of preparing a cold laid paving mixture which comprises heating and mixing rock asphalt to which non-bituminous mineral aggregate has been added, adding thereto emulsified flux, water and bituminous cement, and mixing said minerals while in heated condition to strip added bitumen from the added non-bituminous aggregate to yield a workable mixture.

2. The method of preparing a cold laid rock asphalt paving mixture which comprises heating a native rock asphalt containing particles of mineral aggregate substantially free from and particles entirely free from natural asphalt, adding thereto emulsified flux, water and bituminous cement, and mixing said materials while in heated condition to strip added bitumen from the said particles of mineral aggregate to yield a workable mixture.

3. The method of preparing a cold laid rock asphalt paving mixture which comprises heating a native rock asphalt containing particles of mineral aggregate substantially free from natural asphalt, adding emulsified flux, water and bituminous cement, and mixing said materials while in heated condition to strip added flux and asphalt from the said particles of mineral aggregate to yield a workable mixture.

4. The method of preparing a cold laid rock asphalt paving mixture which comprises heating a native rock asphalt containing particles of mineral aggregate entirely free from natural asphalt, adding flux, water and bituminous cement, and mixing said materials while in heated condition to strip added flux and asphalt from the said particles of mineral aggregate to yield a workable mixture.

5. The method of preparing a cold laid rock asphalt paving mixture which comprises heating rock asphalt containing particles of non-bituminous mineral aggregate, adding bitumen thereto comprising an aqueous emulsion of light flux oil and heated asphaltic cement and mixing said minerals while heated to strip added bitumen from the non-bituminous mineral aggregate to yield a workable mixture.

6. The method of preparing a cold laid paving mixture which comprises heating rock asphalt and added non-bituminous mineral aggregate, adding bitumen thereto comprising an aqueous emulsion of light flux oil and heated asphaltic cement, and mixing said materials while heated to strip added bitumen from the added non-bituminous mineral aggregate to yield a workable mixture.

7. The method of preparing a cold laid paving mixture which comprises heating rock asphalt low in native bitumen to which non-bituminous aggregate has been added, adding thereto emulsified flux, water and bituminous cement, and mixing said materials while in heated condition and adding water thereto to strip added bitumen from the added non-bituminous aggregate to yield a workable mixture.

8. The method of preparing a cold laid rock asphalt paving mixture which comprises heating a native rock asphalt low in bitumen and containing particles of aggregate free from and substantially free from native asphalt, adding thereto flux, water and bituminous cement, and mixing said materials while in heated condition and adding water thereto to strip added flux and asphalt from the originally uncoated and substantially uncoated particles of rock asphalt to yield a workable mixture adapted for laying while cold.

9. The method of preparing a rock asphalt cold paving mixture which comprises heating a native rock asphalt low in native bitumen and containing particles of aggregate free from natural asphalt, adding thereto emulsified flux, water and bituminous cement, and mixing said materials while in heated condition and adding water thereto to strip added flux and asphalt from the original uncoated particles of rock asphalt to produce a workable mixture adapted to be laid cold.

10. The method of preparing a cold laid rock asphalt paving mixture which comprises heating a native rock asphalt low in native bitumen and containing particles of aggregate substantially free from native bitumen, adding thereto emulsified flux, water and bituminous cement, and mixing said materials while in heated condition to strip added flux and asphalt from said particles of aggregate originally substantially free from natural asphalt to yield a workable mixture adapted to be laid cold.

11. The method of preparing a cold laid rock asphalt paving mixture which comprises mixing bituminous cement, emulsified bituminous flux and water with a rock asphalt containing an admixture of non-bituminous mineral aggregate, at temperatures on the order of and between 150° F. and 250° F.

12. The method of preparing a cold laid rock asphalt paving mixture which comprises mixing bituminous cement, bituminous flux and water with a heated rock asphalt low in native asphalt and containing particles of rock not impregnated or coated with native asphalt, at temperatures on the order of and between 150° F. and 250° F.

13. The method of preparing a cold laid rock asphalt paving mixture which comprises mixing bituminous cement, emulsified bituminous flux and water with a heated rock asphalt low in native asphalt content and containing particles of rock asphalt only partially impregnated or coated with native asphalt, at temperatures on the order of and between 150° to 250° F.

14. The process of preparing a cold laid rock asphalt paving mixture which comprises heating a rock asphalt comprising particles lightly coated with native bitumen, and mixing therewith emulsified bituminous flux, bituminous cement and water at a temperature on the order of and between 150° to 250° F. to partially uncoat a portion of said particles of said rock asphalt.

15. The method of preparing a cold laid rock asphalt paving mixture which comprises heating and mixing rock asphalt low in native asphalt and containing particles of rock asphalt free from, or substantially free from native asphalt, adding thereto an aqueous emulsion of light flux oil, heated asphaltic cement and water, and mixing said materials at temperatures on the order of 150° to 200° F. to substantially strip the added bitumen from the said particles of rock asphalt originally free from or substantially free from native asphalt.

16. The method of preparing a cold laid rock asphalt paving mixture which comprises heating and mixing rock asphalt alone in native asphalt having added thereto particles of non-bituminous aggregate, adding thereto an aqueous emulsion of light flux oil, heated asphaltic cement and water, and mixing said materials at temperatures on the order of 250° F. to lightly strip the added bitumen from said particles of non-bituminous aggregate.

JOSEPH H. CONZELMAN.